Figure 1:
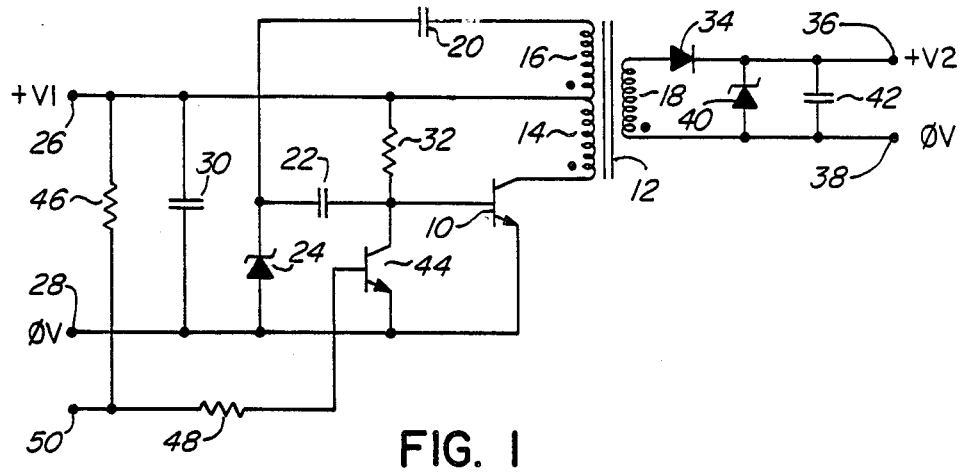

United States Patent [19]

Banfalvi

[11] Patent Number: 4,737,898

[45] Date of Patent: Apr. 12, 1988

[54] SINGLE-ENDED SELF-OSCILLATING, DC-DC CONVERTER WITH REGULATION AND INHIBIT CONTROL

[75] Inventor: Stephen S. Banfalvi, Nepean, Canada

[73] Assignee: Northern Telecom Limited, Montreal, Canada

[21] Appl. No.: 14,896

[22] Filed: Feb. 13, 1987

[51] Int. Cl.[4] .................................... H02M 3/338
[52] U.S. Cl. ................................. 363/19; 331/112; 363/131
[58] Field of Search ............... 363/18, 19, 97, 131; 323/289; 331/112

[56] References Cited

U.S. PATENT DOCUMENTS

| 3,300,705 | 1/1967 | Hunstad | 323/289 |
| 3,743,918 | 7/1973 | Maitre | 363/131 |
| 4,385,347 | 5/1983 | Takematsu | 363/18 |

FOREIGN PATENT DOCUMENTS

| 143623 | 9/1982 | Japan | 363/19 |
| 143621 | 9/1982 | Japan | 363/19 |
| 5772 | 1/1985 | Japan | 363/19 |

*Primary Examiner*—William H. Beha, Jr.
*Attorney, Agent, or Firm*—R. John Haley

[57] ABSTRACT

A transistor oscillator produces at the secondary winding of a transformer output pulses with a pulse width which is dependent upon stored charge in the base of the transistor, the collector-emitter path being connected in series with a primary winding of the transformer and a feedback winding being connected via a capacitive feedback path to the base. The output pulses are rectified and smoothed to produce an output voltage. Regulation of the output voltage is achieved either by a zener diode connected at the output or by reducing the stored charge in the base with a control transistor, which may be a photo-transistor for electrical isolation of the output, whose collector-emitter path is connected in parallel with the base-emitter path of the oscillator transistor.

12 Claims, 1 Drawing Sheet

SINGLE-ENDED SELF-OSCILLATING, DC-DC CONVERTER WITH REGULATION AND INHIBIT CONTROL

This invention relates to d.c.-d.c. converters, hereinafter referred to as power supplies and oscillators suitable for use therein.

It is known to provide a power supply comprising an oscillator which operates at a high frequency, having a transformer-coupled output which is rectified and smoothed to produce an output voltage. Desirable features of such a power supply are that it be protected against short-circuits or excessive loads at its output, be small and efficient in operation, and provide a regulated output voltage from a wide range of oscillator supply voltages.

An object of this invention, is to provide an improved power supply and oscillator therefor.

According to this invention there is provided a power supply comprising: an oscillator, including a transistor, for producing output pulses with a pulse width dependent upon stored charge in a base of the transistor; and means for rectifying and smoothing said output pulses to produce an output voltage.

The power supply preferably includes regulating means for regulating said output voltage. In one embodiment of the invention, the regulating means comprises a zener diode for maintaining the output voltage at a predetermined level.

In other, preferred, embodiments of the invention the regulating means is responsive to the output voltage for reducing stored charge in the base of the transistor thereby to regulate said output voltage. In such embodiments the regulating means acts to reduce the relatively small charge in the base of the oscillator transistor, so that it dissipates negligible heat in contrast to the direct regulation of the output voltage by a zener diode, so that the efficiency of the power supply is enhanced and dissipation is reduced.

The oscillator comprises a transformer having primary, feedback, and secondary windings, said output pulses being produced at the secondary winding and the primary winding being connected in series with a collector-emitter path of the oscillator transistor for coupling to a supply voltage; a reactive feedback path comprising the feedback winding and a capacitance connected in series between the supply voltage and the base of the oscillator transistor; resistive means for supplying current to the base of the oscillator transistor to start an oscillation cycle, the capacitance thereby being charged with current flowing via the base of the oscillator transistor thereby to render the oscillator transistor conductive; and means for providing a discharge path for the capacitance when the oscillator transistor is non-conductive.

In order to limit currents in and voltages applied to the base of the oscillator transistor, the capacitance comprises two capacitors connected in series between the feedback winding and the base of the oscillator transistor, a zener diode being connected between the junction between the capacitors and the emitter of the oscillator transistor.

The means for providing a discharge path can comprise a diode connected between the base and emitter of the oscillator transistor. Alternatively, the power supply may include an inhibit circuit for inhibiting oscillation of the oscillator, the inhibit circuit comprising a transistor having a collector-emitter path connected in parallel with the base-emitter path of the oscillator transistor and having a base via which conduction of the transistor of the inhibit circuit is controlled to inhibit or enable oscillation of the oscillator, the collector-base path of the transistor of the inhibit circuit constituting said means for providing a discharge path.

The regulating means conveniently comprises a regulating transistor having a collector-emitter path connected in parallel with the base-emitter path of the oscillator transistor, and means responsive to the output voltage for controlling conduction of the regulating transistor.

The means for controlling conduction of the regulating transistor can comprise a zener diode. Alternatively, to provide electrical isolation the regulating transistor may comprise a photo-transistor and the means for controlling its conduction may comprise a zener diode and a light-emitting diode connected in series.

The invention also extends to an oscillator comprising: a transistor having a base, a collector, and an emitter; a transformer having a primary winding and a feedback winding, the primary winding being connected in series with the collector-emitter path of the transistor for coupling to a supply voltage; a reactive feedback path comprising the feedback winding and a capacitance connected in series between the supply voltage and the base of the transistor; resistive means for supplying current to the base of the transistor to start an oscillation cycle, the capacitance thereby being charged with current flowing via the base of the transistor thereby to render the transistor conductive for a period dependent upon stored charge in the base of the transistor; and means for providing a discharge path for the capacitance when the transistor is non-conductive.

Figure 2:
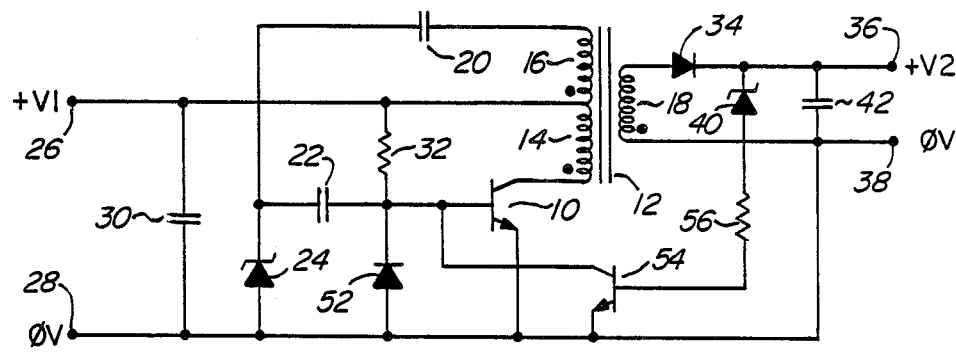
Figure 3:
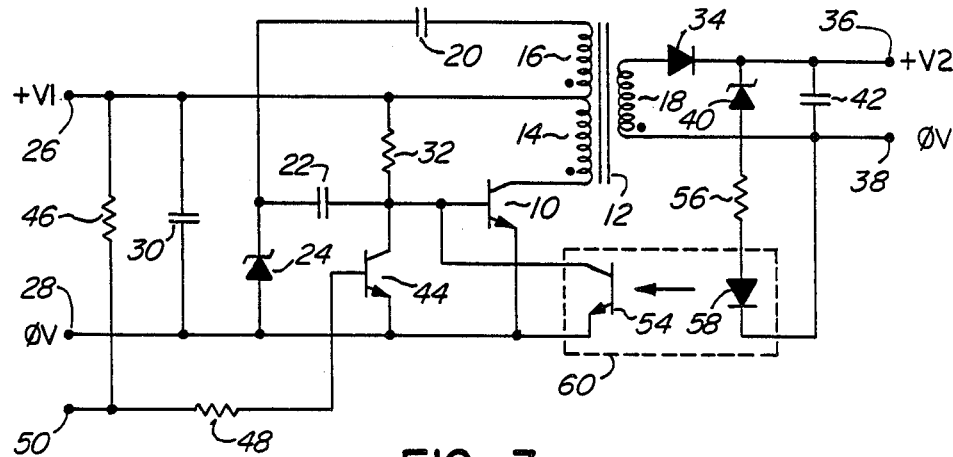

The invention will be further understood from the following description with reference to the accompanying drawings, in which similar references are used in the different figures to denote similar components and in which:

FIGS. 1 to 3 schematically illustrate regulated power supplies in accordance with embodiments of this invention.

Referring to FIG. 1, the regulated power supply shown therein comprises an oscillator including a power transistor 10, a transformer 12 having a tapped winding, forming a primary winding 14 and a feedback winding 16, and a secondary winding 18, and a capacitive feedback path comprising capacitors 20 and 22 and a zener diode 24. Power for the oscillator is supplied from a voltage +V1 supplied to an input supply terminal 26, with respect to a zero voltage (0 V) at an input supply terminal 28, to the primary winding 14 and collector-emitter path of the transistor 10. A smoothing capacitor 30 is connected between the terminals 26 and 28.

A high impedance resistor 32 is connected between the terminal 26 and the base of the transistor 10 to provide for current flow to start the oscillator. The capacitors 20 and 22 act as a voltage divider to feed back a.c. from the feedback winding 16 to the base of the transistor 10 to sustain oscillation, the zener diode 24 being connected between the junction between these capacitors and the 0 V terminal 28 to limit excessive voltages which could otherwise be applied to the transistor 10.

The secondary winding 18 of the transformer 12 is coupled via a rectifying diode 34 to output terminals 36 and 38, between which are connected a zener diode 40 and a smoothing capacitor 42. The zener diode 40 serves to maintain a regulated potential of +V2 at the output terminal 36 relative to zero volts at the terminal 38. A current limiting resistor (not shown) may optionally be provided in series with the diode 34.

The power supply of FIG. 1 also includes an inhibit circuit comprising a transistor 44 having its collector-emitter path connected between the base and emitter of the transistor 10 and its base connected via a resistor 48 to a control input terminal 50 which is also connected via a resistor 46 to the terminal 26.

For example the power supply of FIG. 1 may serve for supplying a regulated voltage (+V2) of about 14 volts at a current of up to 100 mA from a supply voltage (+V1) of about 19 to 75 volts with the transformer windings 14, 16, and 18 having respectively 24, 18, and 30 turns, with polarities shown by dots in the drawing. In this case the capacitors 20 and 22 may have capacitances in the range of 1 to 10 nF, with the capacitors 30 and 44 having capacitances of respectively about 1 $\mu$F and 220 $\mu$F, the resistor 32 may have a resistance of 1 Mohm, and the resistors 46 and 38 may have resistances of respectively about 13 kohm and 51 ohms.

In operation, the oscillator of the power supply of FIG. 1 oscillates at a frequency of about 150 kHz, depending upon the load connected between the output terminals 36 and 38. An excessive load causes the oscillation to stop with the transistor 10 non-conductive, whereby the power supply protects itself from short-circuits at its output. Oscillation is also stopped unless the control input terminal 50 is connected to the 0 V terminal 28 or receives a negative voltage, the transistor 44 in this case being non-conductive because its base-emitter junction is not forward biassed. If the terminal 50 is floating or receives a positive voltage, then the transistor 44 becomes conductive to remove base current from the transistor 10.

Oscillation is started by the resistor 32 allowing a small base current to flow in the transistor 10, positive feedback via the feedback winding 16 and capacitors 20 and 22 producing a pulse of base current which turns the transistor on to saturation. As there is no substantial direct current supply to the base of the transistor 10, this transistor remains on only while there is stored charge in the base; when this is depleted the transistor starts to become non-conductive with the positive feedback producing a negative pulse of base current to turn the transistor 10 off rapidly. The capacitors 20 and 22 then discharge through the collector-base junction of the transistor 44 and the resistor 48, and the oscillation cycle is repeated.

The power supply of FIG. 1 has several advantages. In particular, it provides a relatively stable and short-circuit proof output for a wide range of input voltages, it can be constructed using hybrid circuit techniques with a small size, and its output is electrically isolated from its input. However, it has the disadvantage that the regulating zener diode 40 is dissipative, producing a large amount of heat for low-current loads between the output terminals 36 and 38. This can lead to undesired cooling and reliability problems in equipment in which the power supply is used.

In order to reduce such problems, FIGS. 2 and 3 illustrate alternative embodiments of this invention in which the dissipative regulation of FIG. 1 is replaced by a regulation of the conduction time of the transistor 10, and hence of the duty cycle of the oscillation.

As described above, the period for which the transistor 10 is conductive, and hence during which there is a positive voltage supplied from the secondary winding 18 via the diode 34 to the output terminal 36, is dependent upon stored energy in the base of the transistor 10. In the power supplies of FIGS. 2 and 3, a bypass path for some of this stored energy is provided by the collector-emitter path of a regulating transistor 54 which is controlled in dependence upon the output voltage of the power supply. In consequence, the period during which the transistor 10 is conductive is reduced, whereby the duty cycle of the oscillation is reduced and the output voltage is regulated without substantial dissipation. As a result, the efficiency of the power supply is substantially increased, especially for light loads, to about 60% to 80%, and the above-mentioned thermal and reliability problems are avoided.

In the power supply of FIG. 2, in which the optional inhibit circuit is omitted, a diode 52 is connected directly between the base and emitter of the transistor 10 to provide the discharge path for the capacitors 20 and 22. The zener diode 40, instead of being connected directly between the output terminals 36 and 38 as in FIG. 1, is connected from the terminal 36 via a current limiting resistor 56 to the base of the regulating transistor 54. In consequence, the transistor 54 is turned on just sufficiently to reduce the storage time of the transistor 10 to maintain a desired output voltage (e.g. 14 V), determined by the zener voltage (e.g. 13 V) of the zener diode 40, at the output terminal 36.

The power supply of FIG. 2 has the disadvantage that the output terminal 38 is electrically connected to the input terminal 28, and hence the output is not isolated from the input as may be desired. This disadvantage is avoided by the power supply of FIG. 3, in which the regulating transistor 54 and a light-emitting diode 58 form parts of an opto-coupler 60, thereby electrically isolating the output terminals from the input terminals. In this case the zener diode 40, current limiting resistor 56, and light-emitting diode 58 are connected in series with one another between the output terminals 36 and 38. Apart from the optical isolation and the provision of the inhibit circuit as described with reference to FIG. 1, the power supply of FIG. 3 operates in the same manner as that of FIG. 2.

As the collector-emitter paths of the transistors 44 and 54 are connected in parallel with one another, it should be appreciated that the functions of these devices could conceivably be achieved by a single transistor, with appropriate provision for control of this transistor and discharge of the capacitors 20 and 22. In addition, it should be appreciated that the capacitors 20 and 22 may be replaced by a single capacitor, and the zener diode 24 may be dispensed with, if the transistor 10 is able to handle the resultant base currents and voltages without damage. It is also noted that the oscillator itself may have useful applications in fields other than the field of power supplies.

Numerous other modifications, variations, and adaptations may be made to the particular embodiments of the invention described above without departing from the scope of the invention as defined in the claims.

What is claimed is:

1. A power supply comprising:
    an oscillator, including as oscillator transistor, for producing output pulses with a pulse width dependent upon stored charge in a base of the transistor; and means for rectifying and smoothing said output pulses to produce an output voltage;

wherein the oscillator comprises:

a transformer having primary, feedback, and secondary windings, said output pulses being produced at the secondary winding and the primary winding being connected in series with a collector-emitter path of the oscillator transistor for coupling to a supply voltage;

a reactive feedback path comprising the feedback winding and a capacitance connected in series between the supply voltage and the base of the oscillator transistor, the capacitance comprising two capacitors connected in series between the feedback winding and the base of the oscillator transistor, and a zener diode connected between the junction between the capacitors and the emitter of the oscillator transistor;

resistive means for supplying current to the base of the transistor to start an oscillation cycle, the capacitance thereby being charged with current flowing via the base of the oscillator transistor thereby to render the oscillator transistor conductive; and means for providing a discharge path for the capacitance when the oscillator transistor is non-conductive.

2. A power supply as claimed in claim 1 and including regulating means for regulating said output voltage.

3. A power supply as claimed in claim 2 wherein the regulating means comprises a zener diode for maintaining the output voltage at a predetermined level.

4. A power supply as claimed in claim 2 wherein the regulating means is responsive to the output voltage for reducing stored charge in the base of the transistor thereby to regulate said output voltage.

5. A power supply as claimed in claim 4 wherein the regulating means comprises a regulating transistor having a collector-emitter path connected in parallel with a base-emitter path of the oscillator transistor, and means responsive to the output voltage for controlling conduction of the regulating transistor.

6. A power supply as claimed in claim 5 wherein the means for controlling conduction of the regulating transistor comprises a zener diode.

7. A power supply as claimed in claim 5 wherein the regulating transistor comprises a photo-transistor and the means for controlling its conduction comprises a zener diode and a light-emitting diode coupled in series.

8. A power supply as claimed in claim 1 wherein the means for providing a discharge path comprises a diode connected between the base and emitter of the oscillator transistor.

9. A power supply as claimed in claim 1 and including an inhibit circuit for inhibiting oscillation of the oscillator, the inhibit circuit comprising a transistor having a collector-emitter path connected in parallel with the base-emitter path of the oscillator transistor and having a base via which conduction of the transistor of the inhibit circuit is controlled to inhibit or enable oscillation of the oscillator, the collector-base path of the transistor of the inhibit curcuit constituting said means for providing a discharge path.

10. An oscillator comprising:

a transistor having a base, a collector, and an emitter;

a transformer having a primary winding and a feedback winding, the primary winding being connected in series with the collector-emitter path of the transistor for coupling to a supply voltage;

a reactive feedback path comprising the feedback winding and a capacitance connected in series between the supply voltage and the base of the transistor, the capacitance comprising two capacitors connected in series between the feedback winding and the base of the oscillator transistor, and a zener diode connected between the junction between the capacitors and the emitter of the oscillator transistor;

resistive means for supplying current to the base of the transistor to start an oscillation cycle, the capacitance thereby being charged with current flowing via the base of the transistor thereby to render the transistor conductive for a period dependent upon stored charge in the base of the transistor; and means for providing a discharge path for the capacitance when the transistor is non-conductive.

11. An oscillator as claimed in claim 10 wherein the means for providing a discharge path comprises a diode connected between the base and emitter of the oscillator transistor.

12. An oscillator as claimed in claim 10 and including an inhibit circuit for inhibiting oscillation of the oscillator, the inhibit circuit comprising a transistor having a collector-emitter path connected in parallel with the base-emitter path of the oscillator transistor and having a base via which conduction of the transistor of the inhibit circuit is controlled to inhibit or enable oscillation of the oscillator, the collector-base path of the transistor of the inhibit circuit constituting said means for providing a discharge path.

* * * * *